United States Patent [19]
Cooper

[11] Patent Number: 5,006,836
[45] Date of Patent: Apr. 9, 1991

[54] SQUEEZABLE COMPUTER CONTROL DEVICE

[75] Inventor: James L. Cooper, Tyngsboro, Mass.

[73] Assignee: Wang Laboratories, Inc., Lowell, Mass.

[21] Appl. No.: 206,549

[22] Filed: Jun. 14, 1988

[51] Int. Cl.$^5$ .............................................. G09G 5/08
[52] U.S. Cl. .................................. 340/710; 273/148 B
[58] Field of Search ............. 340/706, 709, 710, 721, 340/723; 200/6 R, 6 A; 273/148 B; 250/221; 74/471 XY

[56] References Cited

U.S. PATENT DOCUMENTS

| | | | |
|---|---|---|---|
| 4,450,325 | 5/1984 | Luque | 200/6 A |
| 4,464,652 | 8/1984 | Lapson et al. | 340/710 |
| 4,698,626 | 10/1987 | Sato et al. | 340/710 |
| 4,786,892 | 11/1988 | Kubo et al. | 340/710 |
| 4,816,810 | 3/1989 | Moore | 340/710 |
| 4,818,978 | 4/1989 | Kurihara et al. | 340/710 |
| 4,831,556 | 5/1989 | Ooon | 340/723 |
| 4,847,484 | 7/1989 | Kikuchi | 340/710 |

FOREIGN PATENT DOCUMENTS 2166627 5/1986 United Kingdom .

OTHER PUBLICATIONS

"Lisa Draw", Apple Computer, Inc., copyright 1983, pp. 22-25, 116-125, 180-181.
"MacPaint", Apple Computer, Inc., copyright 1983, pp. 1-32.

Primary Examiner—Alvin E. Oberley
Assistant Examiner—Richard Hjerpe
Attorney, Agent, or Firm—Michael H. Shanahan; Kenneth L. Milik

[57] ABSTRACT

A control mouse has two opposed outward facing digit-engaging portions on a flexible vertical wall and is sized and shaped to be grasped and moved by squeezing force applied by one hand of an operator with a digit engaging each of the digit-engaging portions. The mouse has a pressure operated switch installed so as to be switched to a first state by squeezing force below a threshold force applied between two digits positioned respectively at the digit-engaging portions and switched to a second state by squeezing force above the threshold force. The switch thus controlled by the operator is used to provide signals to the associated computer.

5 Claims, 4 Drawing Sheets

SQUEEZABLE COMPUTER CONTROL DEVICE

FIELD

This invention relates generally to mouse-type control devices for use with computer displays, and more particulary to an improved mouse which is responsive to a squeezing force applied by the user to generate computer display control signals.

SUMMARY OF THE INVENTION

In many computer controlled display systems, devices are employed, external to the computer keyboard, which allow a user to control the position of a cursor or activate other display functions. Such hand-held "mouse" devices include a motion transducer which responds to the movement of the device over a table surface to control the movement of some displayed feature over the face of the display.

The control mouse according to the present invention features two opposed outward facing digit-engaging portions and is sized and shaped to be grasped and moved by squeezing force applied by one hand of an operator with a digit engaging each of the digit-engaging portions. The mouse has a pressure operated switch installed so as to be switched to a first state by squeezing force below a threshold force applied between two digits positioned respectively at the opposed digit-engaging portions and switched to a second state by squeezing force above the threshold force applied between two digits positioned respectively at the opposed digit-engaging portions. The switch thus controlled by the operator is used to provide signals to the associated computer.

The mouse may additionally feature a periphery cover including flexible vertical wall, with the digit engaging portions being thereon, and the setting of a threshold force so that a squeeze force less than the threshold force applied to the digit-engaging portions is sufficient to grasp and control the mouse.

DETAILED DESCRIPTION

Figure 1:
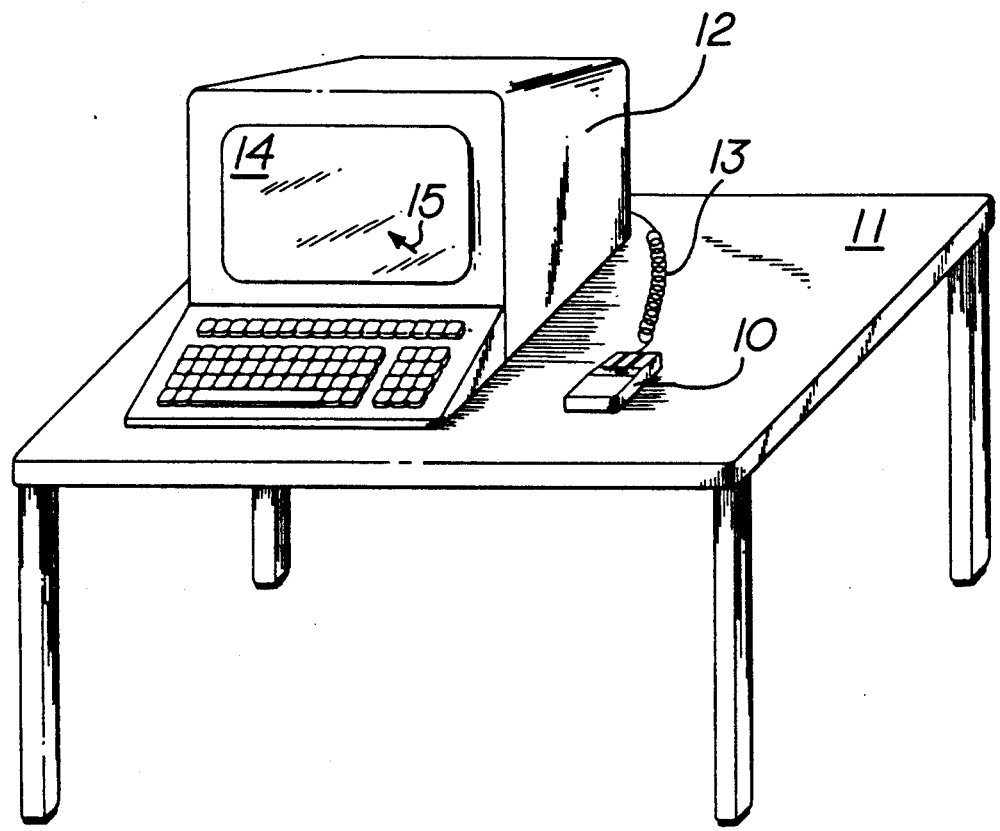
FIG. 1 shows a mouse according to the invention positioned on a table and connected to control the position of a marker arrow on a display of a computer.
Figure 2:
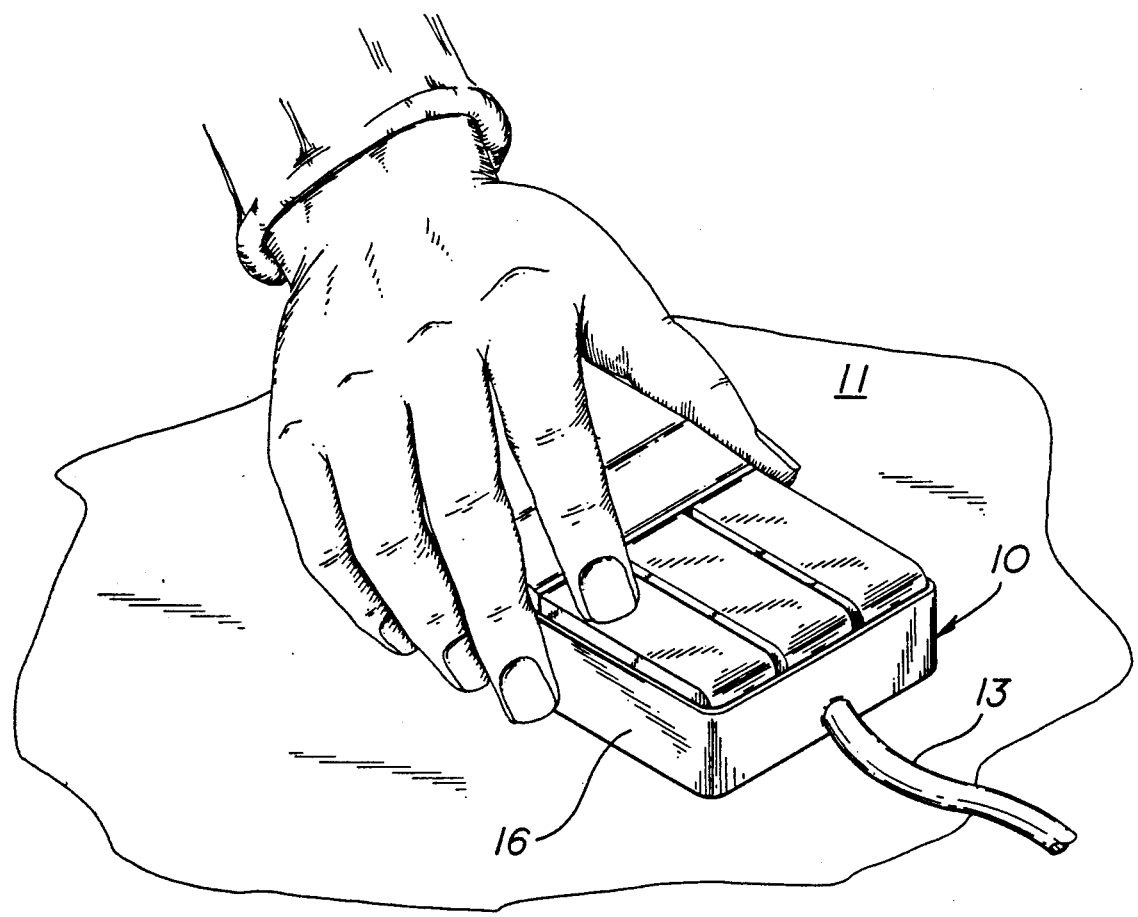
FIG. 2 shows the mouse of FIG. 1 held in the hand of an operator.
Figure 3:
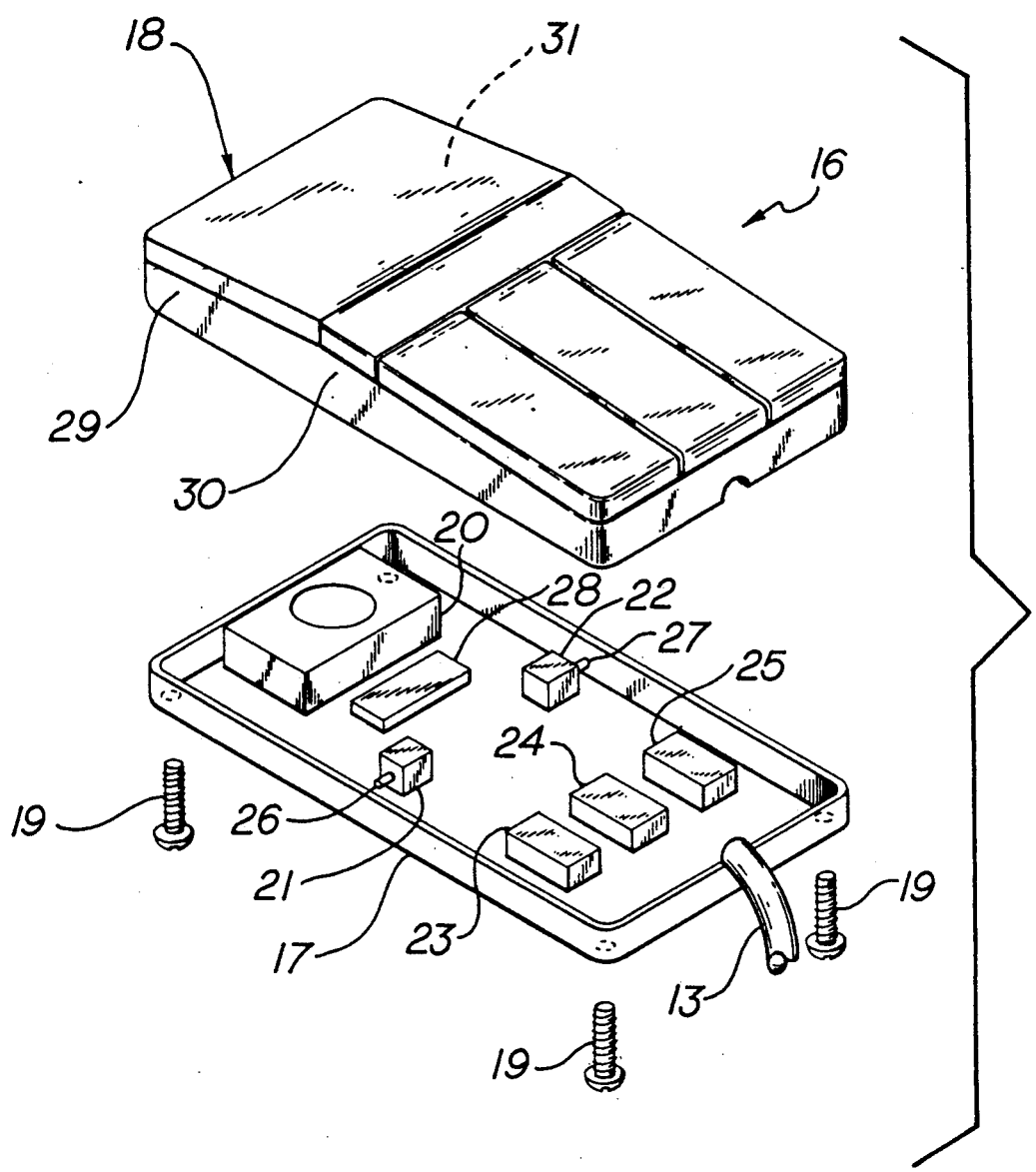
FIG. 3 shows the mouse of FIG. 1 with its case opened to reveal internal components.

Control mouse 10, according to the invention, is shown in FIG. 1 resting on horizontal engagement surface 11 and connected to computer 12 through cable 13, which provides a communications channel. Computer 12 includes a display 14 which has a marker such as arrow 15 displayed thereon.

Mouse 10 includes case 16 having base portion 17 and periphery cover 18 attached thereto by screws 19. On base 17 are mounted motion transducer 20, opto controller 28, and pressure operated switches 23, 24, and 25 with their operating mechanisms directed upwards. Pressure operated switches 21 and 22 are positioned near opposed edges of base 17 and have their operating mechanisms 26, 27 directed outwards. Cable 13 provides means for communicating motion signals from transducer 20 and switch state signals from the switches to computer 12.

Periphery cover 18 includes vertical wall 29 with outward facing digit-engaging portions 30 and 31 in opposed positions on the vertical wall so that they can receive a squeezing force applied by two digits of an operator who is grasping the mouse controller in his hand. The wall 29 is resiliently flexible so that when it is squeezed between portions 30, 31 it moves inward and presses against operating mechanisms 26, 27 of switches 21, 22.

Figure 4:
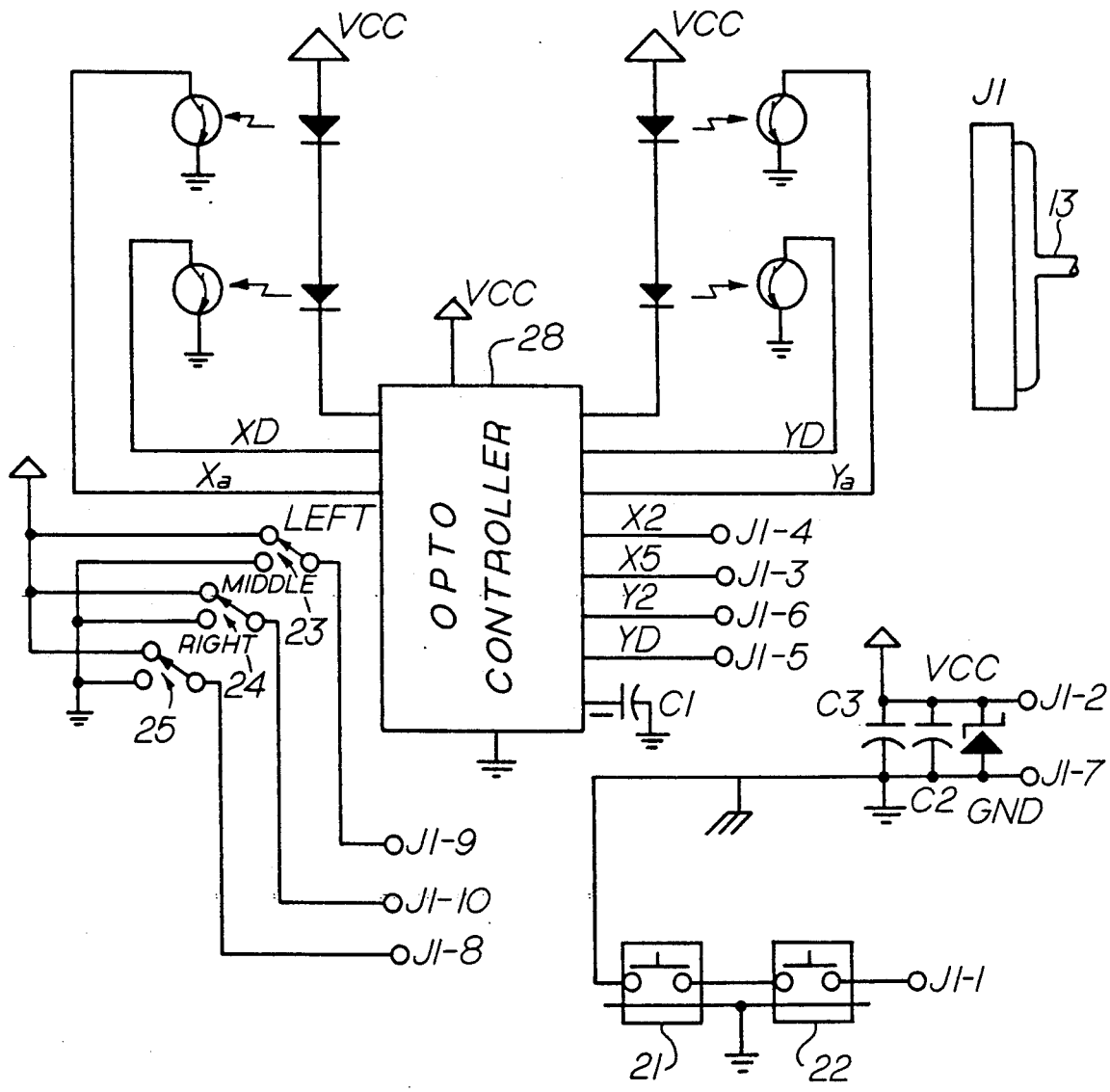
FIG. 4 shows a schematic diagram of the electrical connections of the mouse of FIG. 1.

The electrical components of mouse 10 are connected to each other and to the conductors of cable 13 as shown in FIG. 4. In particular, conductors J1-1 and J1-7 of cable 13 are connected through switches 21 and 22 in series. Since switches 21 and 22 are connected in series they may be considered together as a single composite switch which is closed if both are closed and otherwise open.

The operation of the mouse is as follows. An operator grasps the mouse 10 in his hand in a conventional manner with his thumb in contact with portion 31 of wall 29 and a finger in contact with portion 30. The operator exerts a certain amount of squeezing force between his thumb and finger sufficient to maintain his grasp and effect movement of the mouse over the surface 11 but less than a predetermined actuation threshold force required to throw switches 21 and 22 from their first state to their second state. Thus holding the mouse, the operator controls the motion of arrow 15 in the screen 14 by moving the mouse on surface 11. When the operator wishes to send a signal to the computer, he squeezes harder between his thumb and finger raising the squeezing force above the predetermined threshold force. Under this increased squeezing force the wall 29 is flexed inward and throws composite switch 21-22 from its first state (i.e. open) to its second state (closed). The establishing of a connection between conductors J1-1 and J1-7 of cable 13 through the switches 21, 22, provides a signal that may be used by the computer in its operation. After thus signaling to the computer, the operator may continue to squeeze the sides of the mouse at a level above the predetermined threshold force while further moving the mouse and generating motion signals by the transducer. Then after such motion, the operator may relax the squeezing force between portions 31 and 32 below the predetermined threshold force, with the result that the switches are opened and the circuit through switches 21 and 22 provides a signal through cable 13 to the computer.

The operation of the squeeze switch is extremely easy and rapid for an operator who is grasping the mouse for operation of the transducer. The fingers that manipulate the switch are in place and activity is required only by the small muscles controlling finger motion without activity by the larger muscles controlling arm motion.

The signals generated by the squeezing and unsqueezing of the mouse can be used for any purpose by the computer. Using the mouse with the above described program, an operator has a perception like that of moving his hand to a form shown on the screen, grasping it, moving it, and then releasing it in a new position. This perception makes the manipulation of the mouse control very easy to learn and remember and gives a sense of satisfaction in performing the operation.

What is claimed is:

1. A control mouse for providing control signals to a computer comprising a motion transducer affixed in said mouse in a position to engage an engagement surface against which said mouse is positioned, said transducer generating a motion signal indicative of the motion of said mouse relative to said engagement surface, and a communications channel connected to communicate said motion signal to a computer, said mouse having two opposed outward facing digit-engaging portions, said mouse being sized and shaped to be grasped by squeezing force applied by one hand of an operator with a digit engaging each of said digit-engaging portions to effect movement relative to said surface, said mouse including pressure operated switch means installed so as to be switched to a first state by squeezing force below a predetermined threshold force applied between two digits positioned respectively at said opposed digit-engaging portions and switched to a second state by squeezing force above said threshold force applied between two digits positioned respectively at said opposed digit engaging portions, said mouse including means connected to said switch means for communicating a signal discriminating the states of said switch means to said computer.

2. A control mouse as claimed in claim 1, said mouse having a periphery cover including vertical wall, and said digit engaging portions being on said vertical wall.

3. A control mouse as claimed in claim 2, said vertical wall being flexible, said pressure operated switch means being operated by flexing and unflexing said wall.

4. A control mouse as claimed in claim 1, wherein said predetermined threshold force is set so that a squeeze force less than said predetermined threshold force applied to said digit-engaging portions is sufficient to grasp and control said mouse in motion relative to said surface.

5. A control mouse as claimed in claim 1, wherein said pressure operated switch means includes a pair of series-connected switches, wherein each of said series-connected switches corresponds to an associated digit-engaging portion, and wherein the digit-engaging portions are located in opposed positions on a vertical wall of a periphery cover of the mouse, such that the squeezing force may be applied to the mouse in order to switch between first and second states.

* * * * *